(12) United States Patent
Ji et al.

(10) Patent No.: US 11,906,850 B2
(45) Date of Patent: Feb. 20, 2024

(54) LIQUID CRYSTAL DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Lintao Ji, Beijing (CN); Feifei Wang, Beijing (CN); Kaixuan Wang, Beijing (CN); Bowen Li, Beijing (CN); Xinli Ma, Beijing (CN); Jiao Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 364 days.

(21) Appl. No.: 17/470,164

(22) Filed: Sep. 9, 2021

(65) Prior Publication Data

US 2022/0276536 A1    Sep. 1, 2022

(30) Foreign Application Priority Data

Feb. 26, 2021   (CO) .......................... 202110217093.3

(51) Int. Cl.
G02F 1/13363    (2006.01)
G02F 1/1335     (2006.01)

(52) U.S. Cl.
CPC .. *G02F 1/133634* (2013.01); *G02F 1/133528* (2013.01); *G02F 1/133632* (2013.01)

(58) Field of Classification Search
None
See application file for complete search history.

(56) References Cited

U.S. PATENT DOCUMENTS

2021/0215979 A1*  7/2021  Wang ................ G02F 1/133634

* cited by examiner

*Primary Examiner* — Phu Vu
(74) *Attorney, Agent, or Firm* — DINSMORE & SHOHL LLP (57) ABSTRACT

Embodiments of the present disclosure provide a liquid crystal display panel and a display device. The panel comprises a first and second polarizers, a liquid crystal layer, a first and second optical compensation films. The liquid crystal layer is disposed between the opposite first and second polarizers; the first optical compensation film is located between the first polarizer and the liquid crystal layer, and an optical axis of the first optical compensation film is parallel to a plane where the first optical compensation film is in; and the second optical compensation film is located between the first and second polarizers, an optical axis of the second optical compensation film is parallel to a plane where the second optical compensation film is in and perpendicular to the optical axis of the first optical compensation film, and in-plane retardations of the first and second optical compensation films are equal.

20 Claims, 7 Drawing Sheets

| item | brightness | ordinary liquid crystal display | related peep prevention solution | peep prevention solution provided by the embodiment of the present disclosure |
|---|---|---|---|---|
| simulated | 0° | 1142.45 | 1627.37 | 2468.84 |
| | 45° | 860.38 | 35.0215 | 40.9877 |
| | transmittance enhanced by | | 0 | 51.71% |
| | attenuated to (at a sideways viewing angle) | 75.31% | 2.15% | 1.66% |
| measured actually | attenuated to (at a sideways viewing angle) | | 0.65% | estimated to be 0.5% |

LIQUID CRYSTAL DISPLAY PANEL AND DISPLAY DEVICE

CROSS-REFERENCE TO RELATED APPLICATIONS

This application claims the priority to the Chinese patent application No. 202110217093.3 filed on Feb. 26, 2021, the disclosure of which is hereby incorporated by reference in its entirety into the present application.

TECHNICAL FIELD

The present disclosure relates to the field of display technologies, and particularly, to a liquid crystal display panel and a display device.

BACKGROUND

An LCD (Liquid Crystal Display) has characteristics of small volume, low power consumption, no radiation, etc., and is a display type widely used at present. With the rapid development of the LCD display technology, its application scenarios are continuously developed, and an application scenario of a peep prevention display has come into being. In this scenario, a user facing straight a display screen can see clearly content on the display screen, and persons on both sides of the display screen cannot see clearly the content on the display screen, thereby providing the user with sufficiently private viewing experience.

Dark-state peep prevention is one kind of peep prevention display, in which the user can clearly see the content on the display screen when watching directly against the display screen, while he cannot clearly see the content on the display screen when watching from the both sides of the display screen because the amount of light exit from the display screen is reduced and the viewed pictures are in a dark state. At present, a related dark-state peep prevention display device is formed by superimposing a dimming liquid crystal panel on a display panel, and since the dimming liquid crystal panel comprises a liquid crystal layer and a circuit for driving movement of liquid crystal molecules in the liquid crystal layer, the structure and preparation process of the display device are both relatively complex.

SUMMARY

Embodiments of the present disclosure provide a liquid crystal display panel and a display device, so as to solve the problem that the structure and preparation process of the peep prevention product in the related art are both relatively complex.

According to some embodiments of the present disclosure, there is provided a liquid crystal display panel comprising: a first polarizer; a second polarizer disposed opposite to the first polarizer; a liquid crystal layer disposed between the first polarizer and the second polarizer, the liquid crystal layer comprising liquid crystal molecules whose optical axes are all parallel to an initial direction in the case where the liquid crystal display panel is not powered on; a first optical compensation film disposed between the first polarizer and the second polarizer; wherein an optical axis of the first optical compensation film is parallel to a plane where the first optical compensation film is in; and a second optical compensation film disposed between the first polarizer and the second polarizer, wherein an optical axis of the second optical compensation film is parallel to a plane where the second optical compensation film is in; wherein in-plane retardation $R_{O2}$ of the second optical compensation film is equal to in-plane retardation $R_{O1}$ of the first optical compensation film; and the optical axis of the first optical compensation film is perpendicular to the optical axis of the second optical compensation film.

In some embodiments, the first optical compensation film is a +A compensation film.

In some embodiments, an included angle between the optical axis of the first optical compensation film and the initial direction is $50°±10°$.

In some embodiments, the in-plane retardation $R_{O1}$ of the first optical compensation film is less than or equal to 275 nm in range.

In some embodiments, the in-plane retardation $R_{O1}$ of the first optical compensation film is $137.5$ nm$±10$ nm in range.

In some embodiments, the second optical compensation film is a +A compensation film.

In some embodiments, the first optical compensation film is an optical compensation film based on liquid crystal molecule coating or based on a stretched polymer film; and the second optical compensation film is an optical compensation film based on liquid crystal molecule coating or an optical compensation film based on a stretched polymer film.

In some embodiments, the first optical compensation film and the second optical compensation film are located on both sides of the liquid crystal layer.

In some embodiments, the first optical compensation film and the second optical compensation film are located on a same side of the liquid crystal layer.

In some embodiments, the liquid crystal display panel further comprises: a first base substrate disposed between the first polarizer and the liquid crystal layer; and a second base substrate disposed between the second polarizer and the liquid crystal layer; wherein the first optical compensation film and the second optical compensation film are disposed between the first base substrate and the second base substrate.

In some embodiments, the liquid crystal display panel further comprises a circuit layer disposed on the first base substrate, wherein the first optical compensation film and the second optical compensation film are disposed between the second base substrate and the liquid crystal layer.

In some embodiments, the first optical compensation film is closer to the second base substrate than the second optical compensation film.

According to other embodiments of the present disclosure, there is provided a display device comprising the liquid crystal display panel as described above; and a backlight module disposed on a side of the first polarizer of the liquid crystal display panel away from the liquid crystal layer of the liquid crystal display panel.

In some embodiments, the backlight module is a collimating backlight module.

BRIEF DESCRIPTION OF THE DRAWINGS

In order to more clearly illustrate technical solutions of the embodiments of the present disclosure, the accompanying drawings required to be used in the description of the embodiments or the related art will be briefly introduced below. It is obvious that the drawings in the following description are only some of the embodiments of the present disclosure, and other drawings can be obtained by those of ordinary skill in the art without making any creative effort.

DETAILED DESCRIPTION

The technical solutions in the embodiments of the present disclosure will be described clearly and completely in conjunction with the accompanying drawings in the embodiments of the present disclosure, and it is obvious that the described embodiments are only some of the embodiments of the present disclosure, rather than all of them. All other embodiments, which can be derived by those of ordinary skill in the art from the embodiments disclosed herein without making any creative effort, are intended to fall within the protection scope of the present disclosure.

In the description of the present disclosure, it is to be understood that orientation or position relations indicated by terms "center", "up", "down", "front", "rear", "left", "right", "vertical", "horizontal", "top", "bottom", "inside", "outside", and the like are based on those shown in the drawings, merely for ease of describing the present disclosure and simplifying the description, instead of indicating or implying that an indicated device or element must have a specific orientation and be constructed and operated in the specific orientation, and therefore, they should not be construed as limiting the present disclosure.

Unless otherwise required in the context, throughout the specification and the claims, a term "comprise" and its other forms, such as its third person singular form "comprises" and its present participle form "comprising", will be interpreted as open-minded, i.e., "including, but not limited to". In the description of the specification, terms "one embodiment", "some embodiments", "exemplary embodiments", "example", "specific example" or "some examples" and the like are intended to indicate that a specific feature, structure, material, or characteristic related to the embodiment or example is included in at least one embodiment or example of the present disclosure. The schematic representations of the above terms not necessarily refer to the same embodiment or example. In addition, the specific feature, structure, material, or characteristic can be included in any one or more embodiments or examples in any suitable manner.

Hereinafter, terms "first" and "second" are used for descriptive purposes only and cannot be understood as indicating or implying relative importance or implicitly indicating the number of indicated technical features. Thus, a feature defined as "first" or "second" can explicitly or implicitly include one or more of this feature. In the description of the embodiments of the present disclosure, "a plurality of" means two or more unless otherwise specified.

When some embodiments are described, expressions of "coupled" and "connected", together with their derivatives, may be used. For example, when some embodiments are described, a term "connected" may be used for indicating that two or more components are in direct physical or electrical contact with each other. As another example, when some embodiments are described, a term "coupled" may be used for indicating that two or more components are in direct physical or electrical contact with each other. However, the term "coupled" or "communicatively coupled" may also mean that two or more components are not in direct contact with each other, but yet still co-operate or interact with each other. The embodiments disclosed herein are not necessarily limited to the present disclosure.

"At least one of A, B and C" has the same meaning as "at least one of A, B or C", and both of them comprise the following combinations of A, B and C: A only, B only, C only, a combination of A and B, a combination of A and C, a combination of B and C, and a combination of A, B and C.

"A and/or B" comprises the following three combinations: A only, B only, and a combination of A and B.

"A plurality of" refers to at least two.

The use of "adapted to" or "configured to" herein is open-minded and inclusive, and does not exclude a device adapted to or configured to perform additional tasks or steps.

Additionally, the use of "based on" is open-minded and inclusive, since a process, step, calculation, or other actions "based on" one or more conditions or values can, in practice, be based on additional conditions or exceed the values.

As used herein, "about," "approximately," or "roughly" includes a stated value as well as an average value within an acceptable deviation range of the specific value, wherein the acceptable deviation range is determined by, for example, those of ordinary skill in the art taking into account measurement in question and errors related to measurement of a specific measure (i.e., the limitations of a measurement system).

As used herein, "parallel," "perpendicular," and "equal" include a stated case and a case similar to the stated case, and the similar case is within an acceptable deviation range, wherein the acceptable deviation range is determined by, for example, those of ordinary skill in the art taking into account measurement in question and errors related to measurement of the specific measure (i.e., the limitations of a measurement system). For example, "parallel" includes absolutely parallel and approximately parallel, wherein the acceptable deviation range of approximately-parallel can be, for example, within 5°; and "perpendicular" includes absolutely perpendicular and approximately perpendicular, wherein the acceptable deviation range of approximately-perpendicular can also be, for example, within 5°. "Equal" includes absolutely equal and approximately equal, wherein the acceptable deviation range of approximately-equal can be, for example, that a difference between two equivalents is less than or equal to 5% of either.

Exemplary implementations are described herein with reference to cross-sectional and/or plan views as idealized exemplary drawings. In the drawings, thickness of layers and regions are enlarged for clarity. Thus, variations of shapes relative to the drawings due to, for example, manufacturing techniques and/or tolerances, can be envisaged. Thus, the exemplary implementations should not be construed as being limited to the shapes of regions shown herein, but are intended to include shape deviations due to, for example, manufacturing. For example, an etched region shown as a rectangle will typically have a curved feature. Thus, regions shown in the drawings are schematic in nature and their shapes are not intended to show actual shapes of regions of a device, and are not intended to limit the scope of the exemplary implementations.

Figure 1:
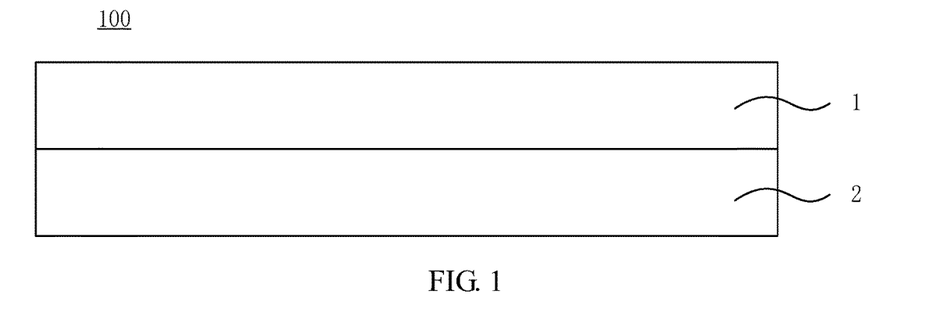
FIG. 1 is a structural diagram of a display device according to embodiments of the present disclosure.

Referring to FIG. 1, some embodiments of the present disclosure provide a display device 100. Exemplarily, the display device 100 can be any device that displays an image, regardless of whether it is a motion image (e.g., video) or a stationary image (e.g., still image), and regardless of whether it is a text or a picture. The display device 100 can be any of a plurality of display devices 100, and the plurality of display devices 100 include, but are not limited to, a mobile phone, a wireless device, a Personal Digital Assistant (Portable Android Device, PAD), a handheld or portable computer, a GPS (Global Positioning System) receiver/navigator, a camera, an MP4 (MPEG-4 Part 14) video player, a video camera, a game console, a flat panel display, a computer monitor, a vehicle display (e.g., a dashboard camera or a reverse camera of vehicle, etc.), and the like.

Continually referring to FIG. 1, the display device 100 can include, for example, a liquid crystal display panel 1 and a backlight module 2, wherein the backlight module 2 can provide a light source for displaying for the liquid crystal display panel 1.

In some embodiments, the backlight module 2 is a collimating backlight module. Backlight provided by the collimating backlight module can exit in a specific direction. Illustratively, an included angle between backlight exiting from the backlight module and a normal direction of a light exiting surface of the backlight module can be restricted within a certain range, so that the backlight can enter eyes of a user facing straight the light exiting surface, and light exiting from the backlight module is greatly reduced at an angle deviating from the normal direction of the light exiting surface, which enables the display device provided with the collimating backlight module to have a better peep prevention effect.

The liquid crystal display panels 1 in the exemplary drawings shown herein are all in a state when no voltage is applied. It can be understood that, after a voltage is applied to the liquid crystal display panel, at least part of liquid crystal molecules in the liquid crystal display panel will be deflected, thereby implementing a picture display function.

Figure 2:
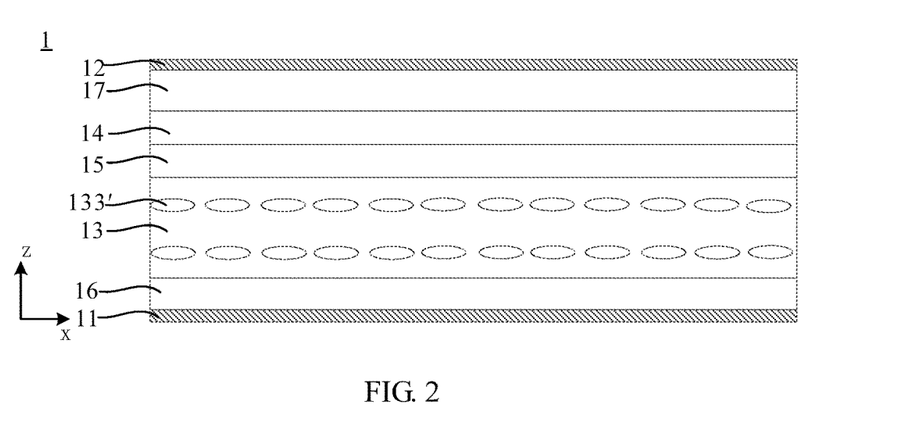
FIG. 2 is a structural diagram of a liquid crystal display panel according to embodiments of the present disclosure.

FIG. 2 is a structural diagram of a liquid crystal display panel according to embodiments of the present disclosure. Referring to FIG. 2, in some embodiments, the liquid crystal display panel 1 comprises a first polarizer 11, a second polarizer 12 disposed opposite to the first polarizer 11, and a liquid crystal layer 13 disposed between the first polarizer 11 and the second polarizer 12. Both the first polarizer 11 and the second polarizer 12 can be linear polarizers. Illustratively, a transmission axis of the first polarizer 11 is perpendicular to a transmission axis of the second polarizer 12, i.e., transmission vibration directions of the two are perpendicular. The optical axis of the liquid crystal molecules of the liquid crystal layer is parallel to one of the transmission axis of the first polarizer 11 and the transmission axis of the second polarizer 12.

In some embodiments, the first polarizer 11 is closer to the backlight module 2 than the second polarizer 12. Illustratively, in the display device 100, the backlight module 2 is disposed on a side of the first polarizer 11 of the liquid crystal display panel 1 away from the liquid crystal layer 13. At this time, the first polarizer 11 is configured to make the light exiting from the backlight module 2 become linearly polarized light. The second polarizer 12 is configured to control a degree with which the light exiting through the liquid crystal layer 13 can transmit through the second polarizer 12.

The liquid crystal layer 13 is disposed between the first polarizer 11 and the second polarizer 12. The liquid crystal layer 13 comprises liquid crystal molecules 133'. As shown in FIG. 2, in the case where the liquid crystal display panel 1 is not powered on, optical axes of the liquid crystal molecules 133' are parallel to an initial direction, and the initial direction herein is an extension direction of an optical axis of any of the liquid crystal molecules 133', that is, the optical axes of the liquid crystal molecules 133' are parallel to each other. Illustratively, referring to FIG. 2, the initial direction is an x direction, which can be parallel to a plane where the first polarizer 11 is in. For example, the liquid crystal display panel 1 can be a display panel of a type using ADS (Advanced Super Dimension Switch), and in the case where the liquid crystal display panel 1 is not powered on, the optical axes of the liquid crystal molecules 133' are all parallel to the initial direction which is, for example, the x direction in FIG. 2. According to the ADS technology, a parallel electric field generated by edges of pixel electrodes in a same plane and a longitudinal electric field generated between a pixel electrode layer and a common electrode layer form a multidimensional electric field, which enables all orientated liquid crystal molecules between and right above pixel electrodes in a liquid crystal cell to generate rotation conversion, thereby improving the working efficiency of planarly-oriented liquid crystals and increasing the light transmission efficiency. The ADS-type liquid crystal display panel has good picture quality, and has advantages of high transmittance, wide viewing angle, high aperture ratio, low chromatic aberration, low response time, no push Mura ripple, and the like.

In some embodiments, referring to FIG. 2, the liquid crystal display panel 1 can further comprise a first base substrate 16 and a circuit layer (not shown) disposed on the first base substrate 16, as well as a second base substrate 17. The first base substrate 16 herein is disposed between the first polarizer 11 and the liquid crystal layer 13; and the second base substrate 17 is disposed between the second polarizer 12 and the liquid crystal layer 13. Illustratively, the first base substrate 16 and the second base substrate 17 can be rigid base substrates; and the rigid base substrate can be, for example, a glass base substrate or a PMMA (Polymethyl methacrylate) base substrate, etc. As another example, the first base substrate 16 and the second base substrate 17 can be flexible base substrates; and the flexible base substrate can be, for example, a PET (Polyethylene terephthalate) base substrate, a PEN (Polyethylene naphthalate two formic acid glycol ester) base substrate, a PI (Polyimide) base substrate, etc.

In some embodiments, referring to FIG. 2, the liquid crystal display panel 1 further comprises a first optical compensation film 14 and a second optical compensation film 15.

Referring to FIG. 2, the first optical compensation film 14, the second optical compensation film 15, and the liquid crystal layer 13 are disposed between the first polarizer 11 and the second polarizer 12, and the first optical compensation film 14, the second optical compensation film 15, and the liquid crystal layer 13 are stacked in a thickness direction (i.e., a z direction) of the liquid crystal display panel 1.

Referring to FIG. 2, the second optical compensation film 15 is closer to the first polarizer 11 than the first optical compensation film 14. The first optical compensation film 14 and the second optical compensation film 15 are located on a same side of the liquid crystal layer 13. The first optical compensation film 14 and the second optical compensation film 15 are both disposed on the second base substrate 17. The first optical compensation film 14 and the second optical compensation film 15 are both disposed between the first base substrate 16 and the second base substrate 17. As shown in FIG. 2, in the liquid crystal display panel 1, an arrangement order of the film layers is: the first polarizer 11, the first base substrate 16, the liquid crystal layer 13, the second optical compensation film 15, the first optical compensation film 14, the second base substrate 17, and the second polarizer 12, which are sequentially disposed in the thickness direction (i.e., the z direction) of the liquid crystal display panel 1.

It should be noted that, the arrangement order of the first optical compensation film 14, the second optical compensation film 15, and the liquid crystal layer 13 in the thickness direction of the liquid crystal display panel 1 is not limited in the present disclosure, and the arrangement order can be determined according to actual needs. The positions of the first optical compensation film 14 and the second optical compensation film 15 in the liquid crystal display panel 1 can be set according to actual needs, and are not limited to such a position arrangement shown in FIG. 2.

For example, in some embodiments, the first optical compensation film 14 and the second optical compensation film 15 can both be disposed on the same side of the liquid crystal layer 13. For example, as shown in FIG. 2, the first optical compensation film 14 and the second optical compensation film 15 can both be disposed between the liquid crystal layer 13 and the second polarizer 12. In other embodiments, the first optical compensation film 14 and the second optical compensation film 15 can both be disposed between the liquid crystal layer 13 and the first polarizer 11.

In some embodiments, the first optical compensation film 14 and the second optical compensation film 15 can be disposed on both sides of the liquid crystal layer 13. For example, one of the first optical compensation film 14 and the second optical compensation film 15 is disposed between the liquid crystal layer 13 and the second polarizer 12, and the other thereof is disposed between the liquid crystal layer 13 and the first polarizer 11.

In other words, either of the first optical compensation film 14 and the second optical compensation film 15 can be disposed anywhere between the first polarizer and the second polarizer, as needed.

The first optical compensation film 14 and the second optical compensation film 15 satisfy the following properties:

the optical axis of the first optical compensation film 14 is parallel to a plane where the first optical compensation film 14 is in; and the optical axis of the second optical compensation film 15 is parallel to the plane where the second optical compensation film 15 is in. The optical axis of the first optical compensation film 14 is perpendicular to the optical axis of the second optical compensation film 15. And in-plane retardation $R_{O2}$ of the second optical compensation film 15 is equal to in-plane retardation $R_{O1}$ of the first optical compensation film 14. Each property will be described in detail below.

It should be noted that, the optical axis (e.g., the optical axis of the first optical compensation film 14, the optical axis of the second optical compensation film 15, and the optical axes of the liquid crystal molecules 133') is also called a light axis. When light is propagated in a crystal, a direction in which forward velocities of two orthogonal waves are equal is an extension direction of the optical axis, in which direction the light has no change in optical characteristics. For example, an anisotropic crystal has a birefringence effect on light propagated therein, but when the light is propagated therein along the optical axis of the anisotropic crystal, no birefringence of the light occurs. Accordingly, the optical axis of the anisotropic crystal can also be defined as a direction in which light can be propagated without birefringence.

In addition, the anisotropic crystal can be further classified into a uniaxial crystal having only one optical axis and a biaxial crystal having two optical axes.

The liquid crystal molecule belongs to the uniaxial crystal having only one optical axis. As for the liquid crystal molecules, they can be classified into rod-type liquid crystal molecules and discotic liquid crystal molecule according to their shapes. In the rod-type liquid crystal molecule, its major axis is the optical axis; and in the discotic liquid crystal molecule, its minor axis is the optical axis.

In some embodiments, the liquid crystal molecules 133' in the liquid crystal layer 13 are all rod-type liquid crystal molecules.

In some embodiments, the first optical compensation film 14 comprises an anisotropic crystal layer having at least one optical axis. In some embodiments, the first optical compensation film 14 is a uniaxial optical compensation film having only one optical axis.

In some embodiments, the optical axis of the first optical compensation film 14 is parallel to the plane where the first optical compensation film 14 is in. Illustratively, the first optical compensation film 14 is a uniaxial optical compensation film having only one optical axis, and the optical axis of the first optical compensation film 14 is parallel to the plane where the first optical compensation film 14 is in. For example, the first optical compensation film 14 is a +A compensation film having a refractive index ellipsoid of $n_{x1}>n_{y1}\approx n_{z1}$ or $n_{x1}>n_{y1}=n_{z1}$. As another example, the first optical compensation film 14 is a −A compensation film having a refractive index ellipsoid of $n_{x1}<n_{y1}\approx n_{z1}$ or $n_{x1}<n_{y1}=n_{z1}$. Herein, $n_{x1}$ is a refractive index in a direction of an $X_1$ axis in the plane of the first optical compensation film 14, $n_{y1}$ is a refractive index in a direction of a $Y_1$ axis perpendicular to the $X_1$ axis in the plane of the first optical compensation film 14, and $n_{z1}$ is a refractive index in a thickness direction of the first optical compensation film 14. The $X_1$ axis herein is the optical axis of the first optical compensation film 14. It should be noted that, in the case where there is a small inclined angle (for example, an inclined angle within 5°) between the $X_1$ axis and the first optical compensation film 14, the $X_1$ axis can also be considered to be located in the plane of the first optical compensation film 14. It can be understood that in the case where there is the small inclined angle between the $X_1$ axis and the first optical compensation film 14, there is a certain difference between $n_{y1}$ and $n_{z1}$, and $n_{y1}$ can be equal or approximately equal to $n_{z1}$ in view of the above.

The in-plane retardation of the first optical compensation film 14 is $R_{O1}=(n_{x1}-n_{y1})\times d_1$, where $n_{x1}$ is the refractive index in the direction of the $X_1$ axis in the plane of the first optical compensation film 14, $n_{y1}$ is the refractive index in the direction of the $Y_1$ axis perpendicular to the $X_1$ axis in the plane of the first optical compensation film 14, and $d_1$ is the thickness of the first optical compensation film 14. Herein, $R_{O1}$, which is the in-plane retardation of the first optical compensation film 14, can be understood as the actual retardation when the light passes through the first optical compensation film 14 in the normal direction (vertical direction).

In some embodiments, the second optical compensation film 15 comprises an anisotropic crystal layer having at least one optical axis. In some embodiments, the second optical compensation film 15 is a uniaxial optical compensation film having only one optical axis.

In some embodiments, the optical axis of the second optical compensation film 15 is parallel to the plane where the second optical compensation film 15 is in. Illustratively, the second optical compensation film 15 is a uniaxial optical compensation film having only one optical axis, and the optical axis of the second optical compensation film 15 is parallel to the plane where the second optical compensation film 15 is in. For example, the second optical compensation film 15 is a +A compensation film having a refractive index ellipsoid of $n_{x2}>n_{y2}\approx n_{z2}$ or $n_{x2}>n_{y2}=n_{z2}$. For example, the second optical compensation film 15 is a −A compensation film having a refractive index ellipsoid of $n_{x2}<n_{y2}\approx n_{z2}$ or $n_{x2}<n_{y2}=n_{z2}$. Herein, $n_{x2}$ is a refractive index in a direction of an $X_2$ axis in the plane of the second optical compensation film 15, $n_{y2}$ is a refractive index in a direction of a $Y_2$ axis perpendicular to the X2 axis in the plane of the second optical compensation film 15, and $n_{z2}$ is a refractive index in a thickness direction of the second optical compensation film 15. The $X_2$ axis herein is the optical axis of the second optical compensation film 15. It should be noted that, in the case where there is a small inclined angle (for example, an inclined angle within 5°) between the $X_2$ axis and the second optical compensation film 15, the $X_2$ axis can be considered to be located in the plane of the second optical compensation film 15. It can be understood that in the case where there is a small inclined angle between the $X_2$ axis and the second optical compensation film 15, there is a certain difference between $n_{y2}$ and $n_{z2}$, and $n_{y2}$ can be equal or approximately equal to $n_{z2}$ in view of the above.

The in-plane retardation of the second optical compensation film 15 is $R_{O2}=(n_{x2}-n_{y2})\times d_2$, where $n_{x2}$ is the refractive index in the direction of the $X_2$ axis in the plane of the second optical compensation film 15, $n_{y2}$ is the refractive index in the direction of the $Y_2$ axis perpendicular to the $X_2$ axis in the plane of the second optical compensation film 15, and $d_2$ is the thickness of the second optical compensation film 15. Herein, $R_{O2}$, which is the in-plane retardation of the second optical compensation film 15, can be understood as the actual retardation when the light passes through the second optical compensation film 15 in the normal direction (vertical direction).

Figure 3A:
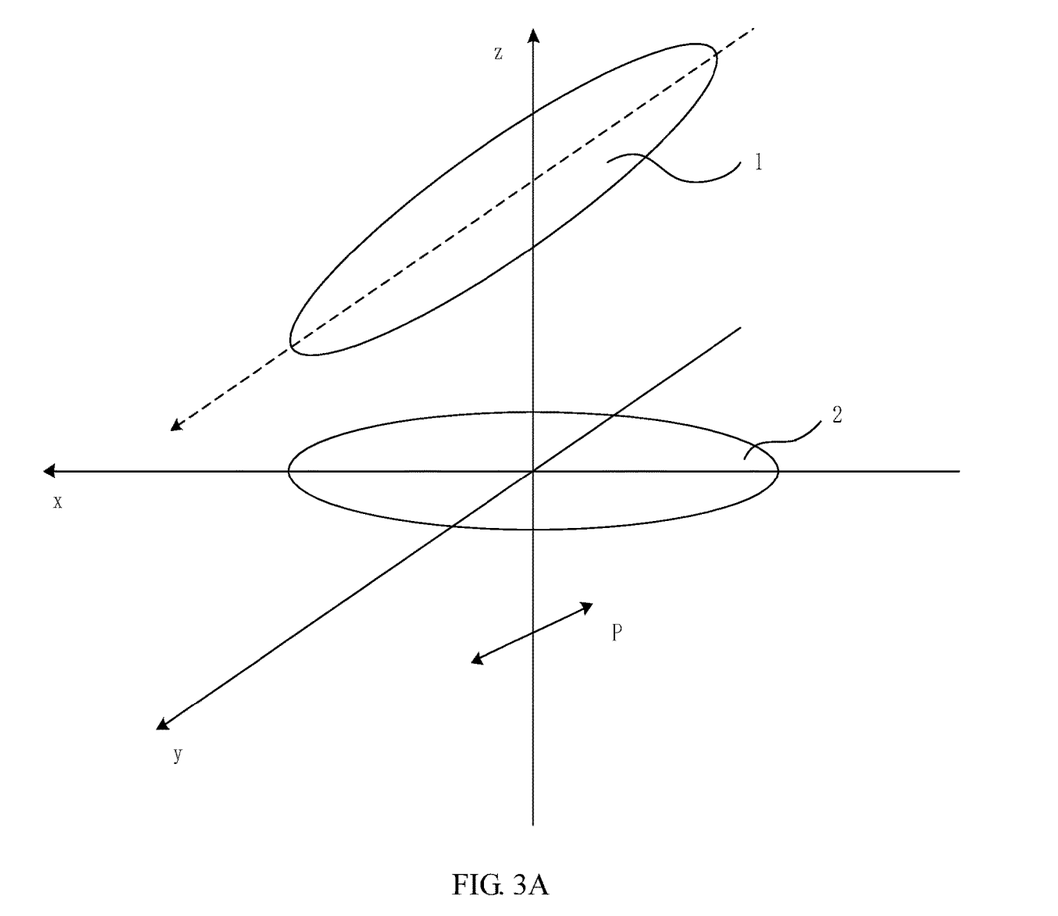
FIG. 3A is a schematic diagram of refractive index ellipsoid distributions of first and second optical compensation films of a liquid crystal display panel according to embodiments of the present disclosure.
Figure 3B:
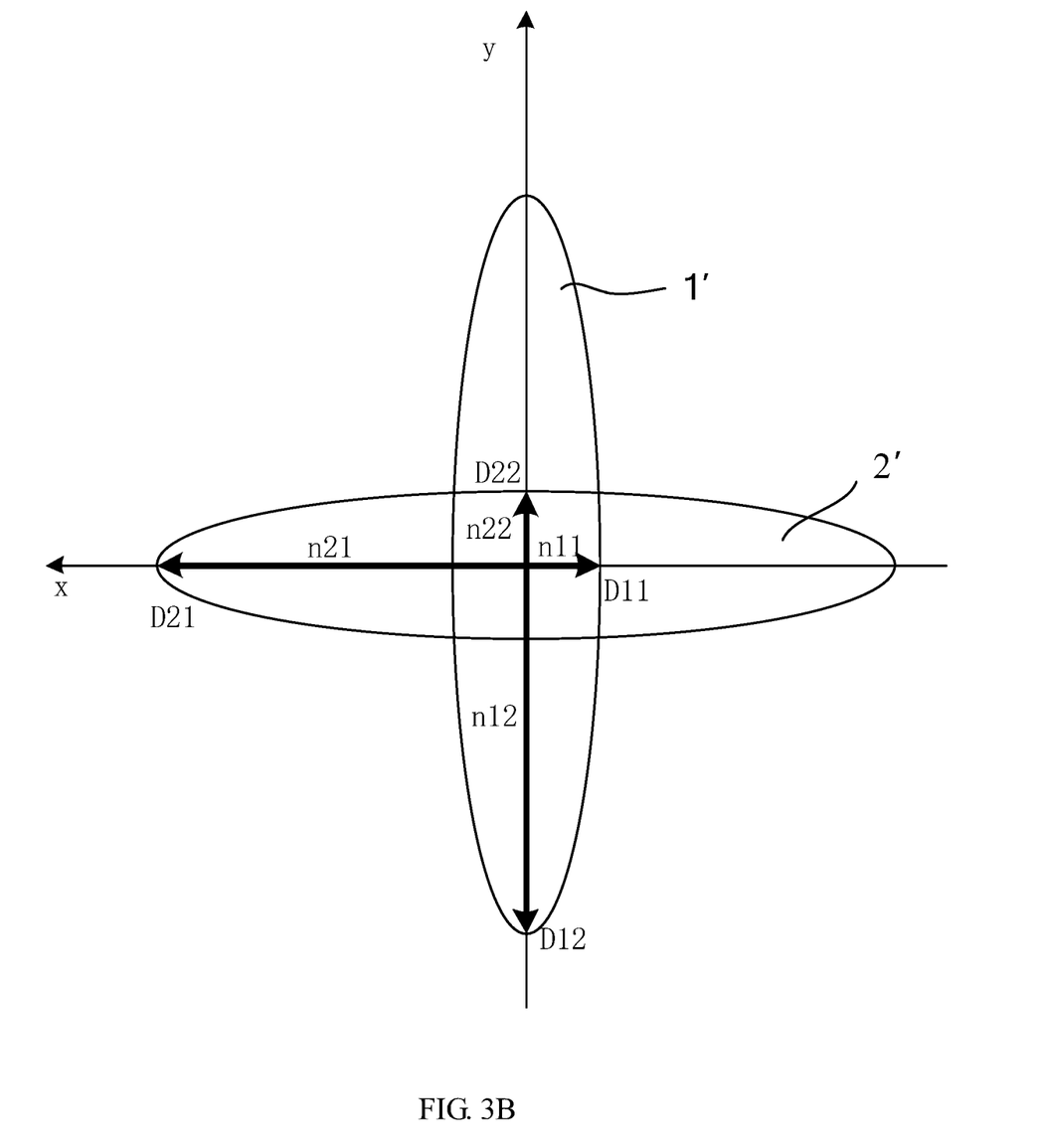
FIG. 3B is a schematic top view of refractive index ellipsoid distributions of first and second optical compensation films of the liquid crystal display panel in a direction parallel to a z direction, according to embodiments of the present disclosure.

In some embodiments, the in-plane retardation $R_{O1}$ of the first optical compensation film 14 is equal to the in-plane retardation $R_{O2}$ of the second optical compensation film 15. And the optical axis of the first optical compensation film 14 is perpendicular to the optical axis of the second optical compensation film 15. In this way, compared with a liquid crystal display panel excluding the optical compensation film, after two optical compensation films so configured are included, a polarization state of light entering the second polarizer 12 in the normal direction of the light exiting surface of the liquid crystal display panel 1 does not change, so that the light intensity of the light exiting from the second polarizer 12 in the normal direction of the light exiting surface of the liquid crystal display panel 1 does not change. That is to say, after the liquid crystal display panel 1 is configured with the two optical compensation films so configured, a display picture observed by the user facing straight the light exiting surface of the liquid crystal display panel 1 does not change, and normal display of the liquid crystal display panel 1 will not be affected. Moreover, compared with the liquid crystal display panel excluding the optical compensation film, after the two optical compensation films so configured are included, a polarization state of light entering the second polarizer 12 in a direction deviating from the normal direction of the light exiting surface of the liquid crystal display panel 1 changes, so that within a certain sideways viewing angle range, the light intensity of the light exiting from the second polarizer 12 in the direction deviating from the normal direction of the light exiting surface of the liquid crystal display panel 1 becomes less, so as to realize peep prevention. Specific explanations are as follows:

Please refer to FIGS. 2, 3A and 3B, wherein FIG. 3B is a top view of FIG. 3A in a direction parallel to a z direction. For ease of explanation, it is assumed that polarized light exiting from the liquid crystal layer 13 is linearly polarized light P, whose wave vector direction is in the z direction. It should be noted that the explanation herein is intended to explain that after the polarized light passes through the first optical compensation film 14 and the second optical compensation film 15 in the normal direction of the light exiting surface of the liquid crystal display panel 1, its polarization state does not change. It can be understood that the polarized light exiting from the liquid crystal layer 13 in the normal direction of the light exiting surface of the liquid crystal display panel 1 has a plurality of polarization states, and none of its polarization states changes after passing through the first optical compensation film 14 and the second optical compensation film 15.

For ease of explanation, it is assumed that the second optical compensation film 15 is a +A compensation film having a refractive index ellipsoid of $n_{x2}>n_{y2}=n_{z2}$; and the first optical compensation film 14 is a +A compensation film having a refractive index ellipsoid of $n_{x1}>n_{y1}=n_{z1}$. The optical axes of the first optical compensation film 14 and the second optical compensation film 15 are perpendicular. The arrangement and direction of the refractive index ellipsoids 1' and 2' of the first and second optical compensation films 14 and 15 are shown in FIG. 3A. As set forth above, that assumption is merely for ease of explanation and does not set any limitation on the scope of the present disclosure.

When the linearly polarized light P enters the second optical compensation film 15 in the z direction, birefringence occurs. That is, the linearly polarized light P therein is divided into linearly polarized light $P_{21}$ and linearly polarized light $P_{22}$. Herein, a direction of an inductance intensity D of the linearly polarized light $P_{21}$ is parallel to $D_{21}$, and its refractive index is $n_{21}$, the value of which is represented by a major semi-axis of an ellipsoid 2'; and a direction of inductance intensity D of the linearly polarized light $P_{22}$ is parallel to $D_{22}$, and its refractive index is $n_{22}$, the value of which is represented by a minor semi-axis of the ellipsoid 2'. Since a propagation velocity of light wave is inversely proportional to refractive index, when $n_{21} > n_{22}$, $v_{21} < v_{22}$, that is, a propagation velocity of the linearly polarized light $P_{21}$ is less than that of the linearly polarized light $P_{22}$, and retardation occurs between the two light waves, the value of which is the in-plane retardation $R_{O2}$ of the second optical compensation film 15, $R_{O2} = (n_{x2} - n_{y2}) \times d_2$, where $n_{x2}$ is the refractive index in the direction of the $X_2$ axis in the plane of the second optical compensation film 15, $n_{y2}$ is the refractive index in the direction of the $Y_2$ axis perpendicular to the $X_2$ axis in the plane of the second optical compensation film 15, and the $X_2$ axis is the optical axis of the second optical compensation film 15. Referring to FIG. 3B, $n_{x2} = n_{21}$, and $n_{y2} = n_{22}$. Therefore, when the linearly polarized light P exits from the second optical compensation film 15, its polarization state changes, and the linearly polarized light P is changed into elliptically polarized light P'.

Subsequently, the elliptically polarized light P' enters the first optical compensation film 14 in the z direction, and birefringence still occurs, and the elliptically polarized light P' therein is divided into linearly polarized light $P_{11}$ and linearly polarized light $P_{12}$. A direction of an inductance intensity D of the linearly polarized light $P_{11}$ is parallel to $D_{11}$, and its refractive index is $n_{11}$, the value of which is represented by a minor semi-axis of a ellipsoid 1'; and a direction of inductance intensity D of the linearly polarized light $P_{12}$ is parallel to $D_{12}$, and its refractive index is $n_{12}$, the value of which is represented by a major semi-axis of the ellipsoid 1'. At this time, $n_{11} < n_{12}$, $v_{11} > v_{12}$, that is, a propagation velocity of the linearly polarized light $P_{11}$ is greater than that of linearly polarized light $P_{12}$, and retardation occurs between the two waves, the value of which is the in-plane retardation $R_{O1}$ of the first optical compensation film 14, $R_{O1} = (n_{x1} - n_{y1}) \times d_1$, where $n_{x1}$ is the refractive index in the direction of the $X_1$ axis in the plane of the first optical compensation film 14, $n_{y1}$ is the refractive index in the direction of the $Y_1$ axis perpendicular to the $X_1$ axis in the plane of the first optical compensation film 14, and the $X_1$ axis is the optical axis of the first optical compensation film 14. Referring to FIG. 3B, $n_{x1} = n_{12}$, and $n_{y2} = n_{11}$.

Since the in-plane retardation $R_{O1}$ of the first optical compensation film 14 is equal to the in-plane retardation $R_{O2}$ of the second optical compensation film 15, the retardation in the first optical compensation film 14 and the retardation in the second optical compensation film 15, which are individually generated by the two linearly polarized lights with the inductance intensities D perpendicular to each other, can be compensated for each other, so that the polarization state of the light exiting from the first optical compensation film 14 is restored to the polarization state of the linearly polarized light P. In this way, compared with the liquid crystal display panel excluding the optical compensation film, the light intensity of the light exiting from the second polarizer 12 in the normal direction of the light exiting surface of the liquid crystal display panel 1 does not change after the two optical compensation films so configured are included. That is to say, after the liquid crystal display panel 1 is configured with the two optical compensation films so configured, the display picture observed by the user facing straight the light exiting surface of the liquid crystal display panel 1 does not change, and the normal display of the liquid crystal display panel 1 will not be affected.

Moreover, it can be deduced by those skilled in the art that, as for the polarized light entering the second polarizer 12 in the direction deviated from the normal direction of the light exiting surface of the liquid crystal display panel 1, since the optical axes of the two compensation films in this direction are not orthogonal, the retardation of the light wave in the first optical compensation film 14 and the retardation of the light wave in the second optical compensation film 15 cannot be compensated for each other. The light intensity of the light exiting from the second polarizer 12 in the normal direction deviating from the light exiting surface of the liquid crystal display panel 1 can be made less within a certain sideways viewing angle range, so as to realize peep prevention.

In some embodiments, in view of actual process preparation and display panel thickness, the in-plane retardation $R_{O1}$ of the first optical compensation film 14 and the in-plane retardation $R_{O2}$ of the second optical compensation film 15 are less than or equal to 275 nm in range.

In some embodiments, the in-plane retardation $R_{O1}$ of the first optical compensation film 14 and the in-plane retardation $R_{O2}$ of the second optical compensation film 15 are 137.5 nm±10 nm in range. Green light has a wavelength between 520 nm and 570 nm, is the most common color in nature and is one of three primary colors. The green light is located in the center of the visible spectrum and is the most sensitive color frequency range for human eyes, that is, green is easily captured by the human eyes. When the in-plane retardation $R_{O1}$ of the first optical compensation film 14 and the in-plane retardation $R_{O2}$ of the second optical compensation film 15 are 137.5 nm±10 nm in range, less green light exiting in the direction deviating from the normal direction of the light exiting surface of the liquid crystal display panel 1 can be achieved, so as to realize a better peep prevention effect.

In some embodiments, an included angle between the optical axis of the first optical compensation film 14 and the initial direction is 50°±10°. Accordingly, an included angle between the optical axis of the second optical compensation film 15 and the initial direction is 140°±10°.

Figure 5:
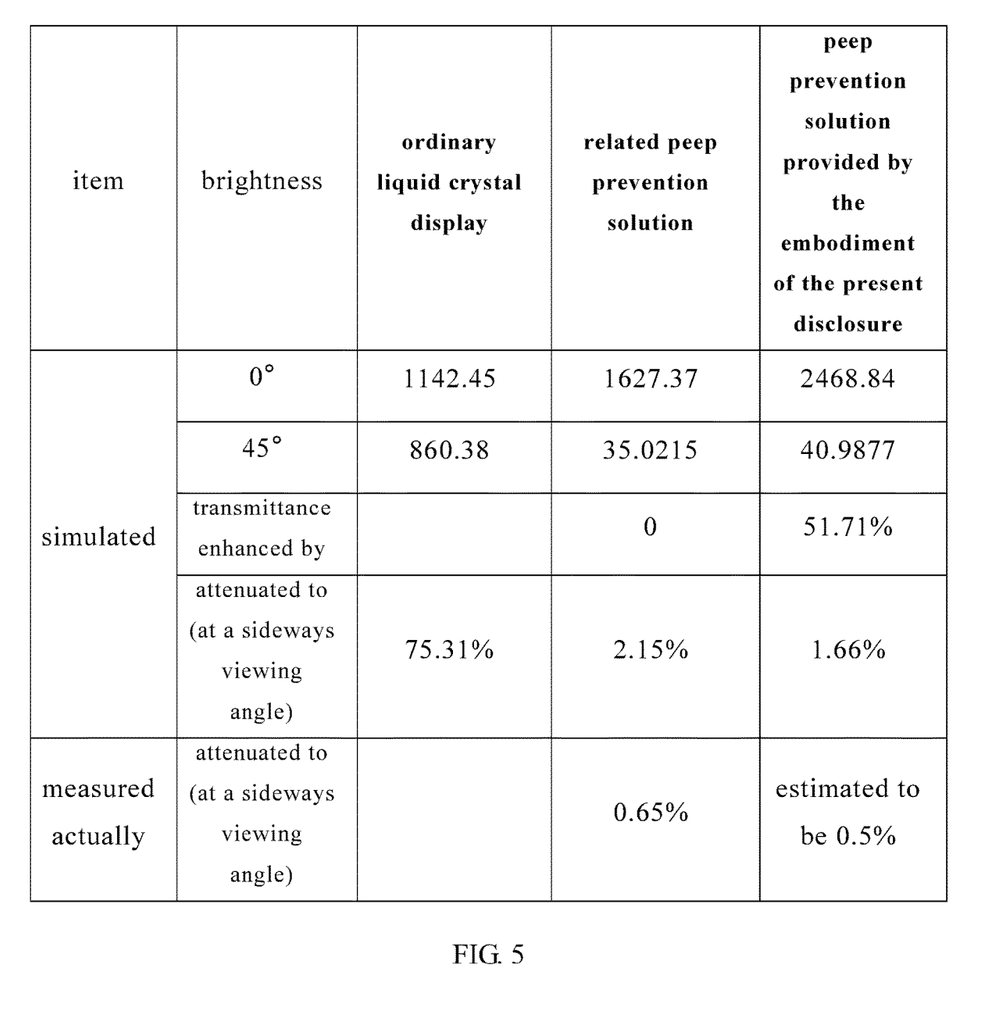
FIG. 5 shows simulated and actually measured data of brightness at viewing angles of 0° and 45° with respect to an ordinary liquid crystal display device, a related dark-state peep prevention display device, and a display device provided by embodiments of the present disclosure, when provided with collimating backlight.

Illustratively, referring to FIGS. 2 and 5, in the liquid crystal display panel 1, the arrangement order of the first polarizer 11, the second polarizer 12, the liquid crystal layer 13, the first optical compensation film 14, the second optical compensation film 15, the first base substrate 16, and the second base substrate 17 is shown in the figures. In the case where the liquid crystal display panel 1 is not powered on, the optical axes of the liquid crystal molecules 133' are all parallel to the initial direction, for example, the x direction. The first optical compensation film 14 is a +A compensation film, its optical axis makes an included angle of 50° with the initial direction, and its in-plane retardation $R_{O1}$=137.5 nm. The second optical compensation film 15 is a +A compensation film, its optical axis is perpendicular to the optical axis of the first optical compensation film 14, and accordingly, the optical axis of the second optical compensation film 15 makes an included angle of 140° with the initial direction, and its in-plane retardation $R_{O2}$=137 0.5 nm. FIG. 5 shows simulated and actually measured data of brightness at 0° and 45° viewing angles with respect to an ordinary liquid crystal display device (i.e., a liquid crystal display panel without a peep prevention device), a related dark-state peep prevention display device, and a display device provided by embodiments of the present disclosure, when provided with the collimating backlight. As can be seen from FIG. 5, when provided with the collimating backlight, compared with the dark-state peep prevention display device using the dimming liquid crystal panel in the related art, the display device using the two layers of +A compensation films provided by the embodiment of the present disclosure has a brightness at a sideways viewing angle (45°) that can reach 0.5% of a brightness at a straight viewing angle, which is better than the display device using the dimming liquid crystal panel in the related art (0.65%). Moreover, the display device provided by the embodiment of the present disclosure has a higher brightness at the straight viewing angle (0°), and the transmittance is enhanced by 51.71%.

Figure 6:
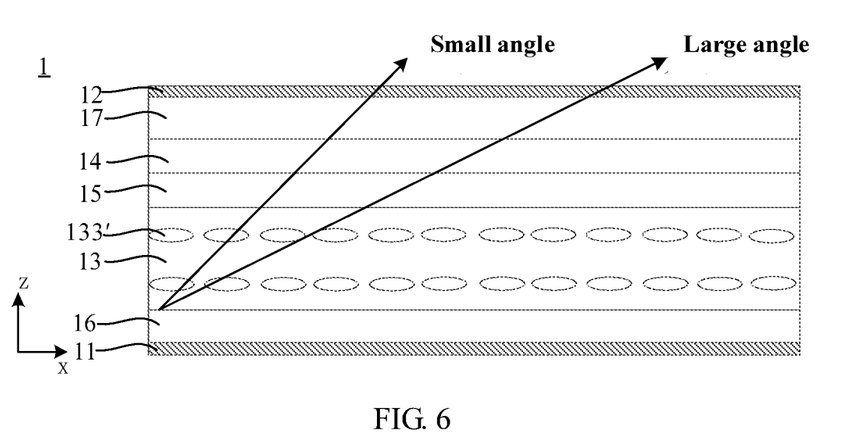
FIG. 6 is a structural diagram of another liquid crystal display panel provided by embodiments of the present disclosure.
Figure 7A:
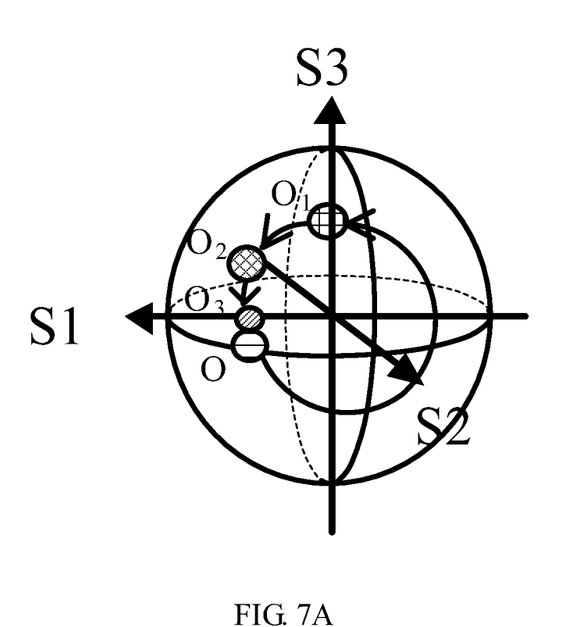
FIG. 7A is a position diagram of polarization states in a Poincare sphere diagram when light passes through layers in the liquid crystal display panel of FIG. 6 in a small angle direction in FIG. 6.
Figure 7B:
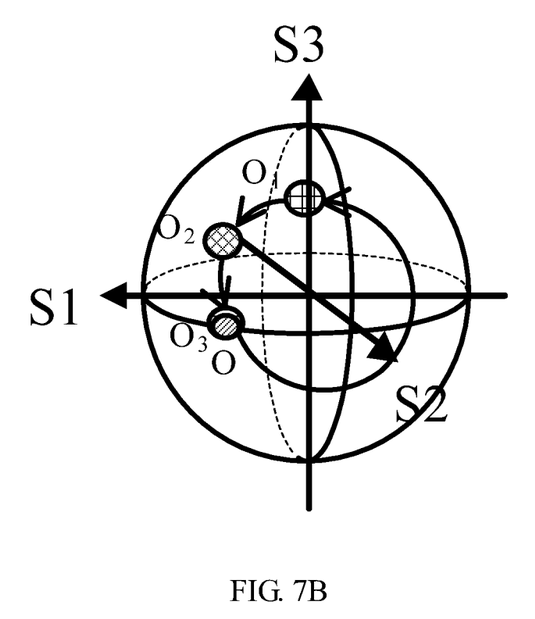
FIG. 7B is a position diagram of polarization states in a Poincare sphere diagram when light passes through layers in the liquid crystal display panel of FIG. 6 in a large angle direction in FIG. 6.

Referring to FIGS. 6, 7A and 7B, for the structure of the liquid crystal display panel 1 in FIG. 6, please refer to Poincare sphere diagrams shown in FIGS. 7A and 7B, wherein FIG. 7A is a diagram showing positions of polarization states in a Poincare sphere when light passes through layers in a liquid crystal display panel in a small angle direction in FIG. 6; and FIG. 7B is a diagram showing positions of polarization states in a Poincare sphere when light passes through layers of a liquid crystal display panel in a large angle direction in FIG. 6. Referring to FIGS. 6 and 7A, in a light exiting direction (the small angle direction shown in FIG. 6), after the light exiting from the backlight module passes through the first polarizer 11, its polarization state is at O, and the light at this time is linearly polarized light; and after the light passes through the liquid crystal layer 13, its polarization state is at $O_1$, after the light passes through the second optical compensation film 15, its polarization state is at $O_2$, and after the light passes through the first optical compensation film 14, its polarization state is at $O_3$. Referring to FIGS. 6 and 7B, in the light exiting direction (the large angle direction shown in FIG. 6), after the light exiting from the backlight module passes through the first polarizer 11, its polarization state is at O, and the light at this time is linearly polarized light; after the light passes through the liquid crystal layer 13, its polarization state is at $O_1$, after the light passes through the second optical compensation film 15, its polarization state is at $O_2$, and after the light passes through the first optical compensation film 14, its polarization state is at $O_3$. With the increase of the sideways viewing angle, O and $O_3$ are closer to coincidence, the light exiting from the second polarizer 12 can be made less when the second polarizer 12 is provided, so as to realize peep prevention.

Figure 4:
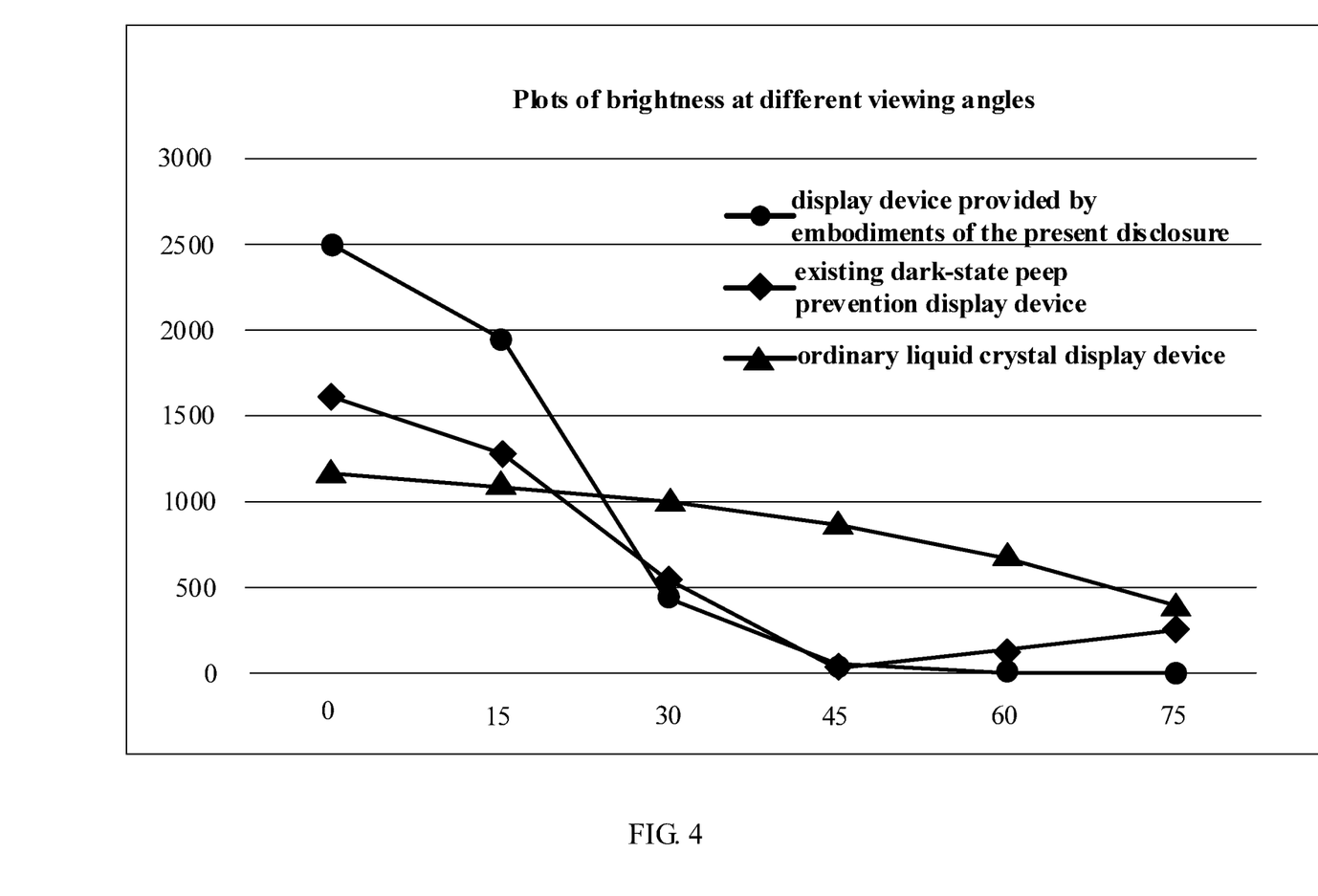
FIG. 4 shows plots of brightness at different viewing angles with respect to the liquid crystal display device and the dark-state peep prevention display device in the related art and a display device provided by embodiments of the present disclosure.

In addition, FIG. 4 shows plots of brightness at different viewing angles (viewing angles from 0° to 75°) with respect to the ordinary liquid crystal display device (i.e., a liquid crystal display device without a peep prevention device), a related dark-state peep prevention display device, and a display device provided by embodiments of the present disclosure. As shown in FIG. 4, there is brightness inversion at a large viewing angle in the peep prevention solution of the related art, that is, the brightness should have been reduced with the increase of the viewing angle, but when this solution is used, there is an brightness increase with the increase of the viewing angle. And for the peep prevention solution provided by the embodiment of the present disclosure, there is no brightness increase with the increase of the viewing angle.

The type of the first optical compensation film 14 is determined dependent on actual use needs and/or process requirements. In some embodiments, the first optical compensation film 14 is an optical compensation film based on liquid crystal molecular coating. And in other embodiments, the first optical compensation film 14 is an optical compensation film based on a stretched polymer film.

The type of the second optical compensation film 15 is determined dependent on actual use needs and/or process requirements. In some embodiments, the second optical compensation film 15 is an optical compensation film based on liquid crystal molecule coating. And in other embodiments, the second optical compensation film 15 is an optical compensation film layer based on a stretched polymer film.

Herein, the polymer film before being stretched can be prepared by solution casting, melt extrusion or any other film forming technique known in the art, and the polymer film before being stretched can include polystyrene films, polynorbornene films, and the like. In some embodiments, the polymer film before being stretched is a non-liquid crystal polymer film. When the first optical compensation film 14 or the second optical compensation film 15 is fabricated, a desired optical compensation film can be obtained by stretching the polymer film.

Finally, it should be noted that: the above embodiments are only used to illustrate the technical solutions of the present disclosure, but not to limit them; and although the present disclosure has been described in detail with reference to the foregoing embodiments, it should be understood by those of ordinary skill in the art that: the technical solutions described in the foregoing embodiments can still be modified, or some of technical features thereof can be equivalently replaced; and these modifications and replacements do not depart the essence of the corresponding technical solutions from the spirit and scope of the technical solutions of the embodiments of the present disclosure.

What is claimed is:

1. A liquid crystal display panel comprising:
   a first polarizer;
   a second polarizer disposed opposite to the first polarizer;
   a liquid crystal layer disposed between the first polarizer and the second polarizer, the liquid crystal layer comprising liquid crystal molecules whose optical axes are all parallel to an initial direction in the case where the liquid crystal display panel is not powered on;
   a first optical compensation film disposed between the first polarizer and the second polarizer; wherein an optical axis of the first optical compensation film is parallel to a plane where the first optical compensation film is in; and
   a second optical compensation film disposed between the first polarizer and the second polarizer, wherein an optical axis of the second optical compensation film is parallel to a plane where the second optical compensation film is in;
   wherein in-plane retardation $R_{O2}$ of the second optical compensation film is equal to in-plane retardation $R_{O1}$ of the first optical compensation film; and
   the optical axis of the first optical compensation film is perpendicular to the optical axis of the second optical compensation film.

2. The liquid crystal display panel according to claim 1, wherein the first optical compensation film is a +A compensation film.

3. The liquid crystal display panel according to claim 2, wherein an included angle between the optical axis of the first optical compensation film and the initial direction is 50°±10°.

4. The liquid crystal display panel according to claim 1, wherein the in-plane retardation $R_{O1}$ of the first optical compensation film is less than or equal to 275 nm in range.

5. The liquid crystal display panel according to claim 4, wherein the in-plane retardation $R_{O1}$ of the first optical compensation film is 137.5 nm±10 nm in range.

6. The liquid crystal display panel according to claim 1, wherein the second optical compensation film is a +A compensation film.

7. The liquid crystal display panel according to claim 1, wherein the first optical compensation film is an optical compensation film based on liquid crystal molecule coating or an optical compensation film based on a stretched polymer film; and the second optical compensation film is an optical compensation film based on liquid crystal molecule coating or an optical compensation film based on a stretched polymer film.

8. The liquid crystal display panel according to claim 1, wherein the first optical compensation film and the second optical compensation film are located on both sides of the liquid crystal layer.

9. The liquid crystal display panel according to claim 1, wherein the first optical compensation film and the second optical compensation film are located on a same side of the liquid crystal layer.

10. The liquid crystal display panel according to claim 1, further comprising:
a first base substrate disposed between the first polarizer and the liquid crystal layer; and
a second base substrate disposed between the second polarizer and the liquid crystal layer;
wherein the first optical compensation film and the second optical compensation film are disposed between the first base substrate and the second base substrate.

11. The liquid crystal display panel according to claim 10, further comprising: a circuit layer disposed on the first base substrate, wherein the first optical compensation film and the second optical compensation film are disposed between the second base substrate and the liquid crystal layer.

12. The liquid crystal display panel according to claim 11, wherein the first optical compensation film is closer to the second base substrate than the second optical compensation film.

13. A display device comprising:
the liquid crystal display panel according to claim 1; and
a backlight module disposed on a side of the first polarizer of the liquid crystal display panel away from the liquid crystal layer of the liquid crystal display panel.

14. The display device according to claim 13, wherein the backlight module is a collimating backlight module.

15. The liquid crystal display panel according to claim 13, wherein the first optical compensation film is a +A compensation film.

16. The liquid crystal display panel according to claim 13, wherein an included angle between the optical axis of the first optical compensation film and the initial direction is 50°±10°.

17. The liquid crystal display panel according to claim 13, wherein the in-plane retardation $R_{O1}$ of the first optical compensation film is 137.5 nm±10 nm in range.

18. The liquid crystal display panel according to claim 13, wherein the second optical compensation film is a +A compensation film.

19. The liquid crystal display panel according to claim 13, wherein
the first optical compensation film is an optical compensation film based on liquid crystal molecule coating or an optical compensation film based on a stretched polymer film; and
the second optical compensation film is an optical compensation film based on liquid crystal molecule coating or an optical compensation film based on a stretched polymer film.

20. The liquid crystal display panel according to claim 13, further comprising:
a first base substrate disposed between the first polarizer and the liquid crystal layer;
a second base substrate disposed between the second polarizer and the liquid crystal layer; and
a circuit layer disposed on the first base substrate, wherein the first optical compensation film and the second optical compensation film are disposed between the second base substrate and the liquid crystal layer; and
the first optical compensation film is closer to the second base substrate than the second optical compensation film.

* * * * *